United States Patent [19]
Gardiner et al.

[11] Patent Number: 6,052,125
[45] Date of Patent: Apr. 18, 2000

[54] METHOD FOR REDUCING THE RENDERING LOAD FOR HIGH DEPTH COMPLEXITY SCENES ON A COMPUTER GRAPHICS DISPLAY

[75] Inventors: Harold Dee Gardiner, Sandy; Russell Joseph Urry, West Jordan, both of Utah

[73] Assignee: Evans & Sutherland Computer Corporation, Salt Lake City, Utah

[21] Appl. No.: 09/003,938

[22] Filed: Jan. 7, 1998

[51] Int. Cl.[7] ................................................ G06F 15/00
[52] U.S. Cl. ..................... 345/421; 345/422; 345/426; 345/507; 345/509
[58] Field of Search .................................. 345/421–422, 345/426, 507, 509

[56] References Cited

U.S. PATENT DOCUMENTS

| | | | |
|---|---|---|---|
| 4,825,391 | 4/1989 | Merz | 364/526 |
| 5,359,704 | 10/1994 | Rossignac et al. | 395/122 |
| 5,471,567 | 11/1995 | Soderberg et al. | 395/133 |
| 5,604,849 | 2/1997 | Artwick et al. | 395/123 |
| 5,870,097 | 2/1999 | Snyder et al. | 345/426 |
| 5,923,333 | 7/1999 | Stroyan | 345/422 |

*Primary Examiner*—Mark R. Powell
*Assistant Examiner*—Lance W. Sealey
*Attorney, Agent, or Firm*—Thorpe, North & Western, LLP

[57] ABSTRACT

A method and apparatus for rendering a real-time synthetic environment on a computer display. A hidden surface removal technique is provided which combines an efficient pixel rendering architecture with a simplified modeling process. Specifically, the computer pixel graphics hardware processing load is balanced against a software geometric load to obtain optimum rendering performance by utilizing a "full" buffer in combination with adaptations of the z-Buffer and priority-list algorithms.

36 Claims, 4 Drawing Sheets

METHOD FOR REDUCING THE RENDERING LOAD FOR HIGH DEPTH COMPLEXITY SCENES ON A COMPUTER GRAPHICS DISPLAY

BACKGROUND

1. The Field Of The Invention

This invention relates generally to generating two and three dimensional synthetic or virtual reality environments. More specifically, the present invention provides a new method for improving rendering performance by a computer's graphics or display circuitry. By balancing the tasks of geometric computations and pixel rendering, the present invention combines the advantages of two distinct surface-removal strategies to obtain substantially faster graphics rendering.

2. The State Of The Art

Creating and manipulating a computer-generated synthetic or virtual environment in real-time can require substantial computing resources. Many factors influence the success of the synthetic environment to duplicate a desired reality. For example, one factor is the level of scene complexity of the desired synthetic environment. Another factor is the speed at which the synthetic environment must be rendered.

Techniques have been developed for the purpose of enhancing the synthetic environment experience. Enhancement of the synthetic environment is desirable for such purposes as generating a more complex and thus more realistic synthetic environment, or increasing the speed of the computer system to obtain a better real-time experience. However, these techniques for synthetic environment enhancement can be applied regardless of an application's requirements. Accordingly, these techniques might generate the same synthetic environment while demanding less computer resources, or they might generate a more complex synthetic environment utilizing the same computer resources.

Of particular interest is the generation of a synthetic environment in a general purpose computer. As computer technology becomes more powerful, many performance problems that were once solved with dedicated hardware are now being solved utilizing general purpose computers. However, one aspect of displaying a synthetic environment that still often requires dedicated hardware acceleration is that of rendering two and three dimensional computer graphics. Many computer programs have graphics demands which require extremely high image rendering rates. Some applications, such as simulation in a synthetic environment even demands real-time rendering at 30 or even 60 frames per second. Nevertheless, even applications which can perform adequately utilizing a software solution will always perform better with faster image rendering.

As processing power of computers increases, so do the expectations of the user. With respect to computer generated synthetic environments, the user's expectations are that scene complexity and hence realism, continue to increase. It is also expected that these more complex scenes will still be rendered at 30 to 60 frames per second (fps). The advantages of a more realistic environment combined with consistent real-time performance thus extend far beyond the entertainment of a mere game. For example, the military applications of being able to train and test soldiers without the expense of using actual equipment and live ammunition reap substantial benefits.

Before a synthetic image can be rendered on a computer display, the scene must first be modeled in a format that the computer can utilize. Modeling techniques and tools describe the synthetic environment with primitives which can be rendered by the graphics hardware. Renderable primitives often include such things a dots, lines and triangles. Sometimes, higher order surfaces such as polygons, meshes, strips, and surface patches are also supported. These are the lowest order of building blocks or primitives which can be put together to create a synthetic object or scene. Regardless of the method used to model the synthetic environment, the graphics hardware (or software) must convert those primitives into an array of pixels which can be drawn on a display device. The process of converting modeled primitives into visible pixels on the computer display is the rendering process.

As the complexity of the synthetic environment increases, the demand on the rendering process likewise increases. As mentioned, dedicated hardware known as graphics accelerators are often used to improve the rendering performance for the more complex synthetic environments. However, this rendering hardware can become quite expensive because of the vast number of mathematical calculations that must be performed for each pixel. For software based solutions, the process can still be "expensive" in the sense that rendering time can become intolerably slow. This "expense" will be referred to often, and should be assumed to include that actual cost in money of accelerating hardware, or the cost in time when the solution is purely accomplished in software.

Another useful term which will also be referred to is a frame buffer. To render flicker-free synthetic images on a computer display, a double buffered frame buffer is typically used. Once the image has been rendered into one of the buffers, the buffers can be swapped, allowing the image to be displayed on the screen while the next frame image is being rendered into the other buffer.

For a given computer display size, the number of frame buffer pixels which must be displayed remains constant. However, the number of pixels which must be processed in order to fill the frame buffer is highly dependent upon the complexity of the synthetic scene. The ratio of the number of rendered pixels relative to the number of displaced pixels is known as the average pixel depth complexity. This ratio is an indication, on average, of how many primitives cover each pixel on the screen. The peak depth complexity would indicated the number of primitives which cover the pixel which is "touched" the most. These depth complexity values indicate how much effort goes into creating each synthetic image, and the values vary greatly depending on the modeled environment and the current viewer's position within that environment.

For example, when rendering a region of mountainous terrain covered with trees as viewed from above, the average depth complexity will typically lie somewhere between one and two. The peak depth complexity may be two. Pixels only displaying the terrain require touching just once, whereas pixels covered by a tree require two touches, one for the tree and one for the terrain. If the viewer's position is now moved down within the trees with a line of sight towards the horizon, the depth complexity numbers will increase dramatically. This is because in the line of sight, any single pixel might have a hundred trees all lined up with the user's point of view. Thus, if the forest is quite dense, the average depth complexity may go up into the tens, or even higher. Also, the complexity of the synthetic model affects depth complexity. The more complex the environment, the greater the average depth complexity.

In order to reduce the amount of hardware (or time) required to render a synthetic scene, or to enable more complex rendering with the same hardware (or within the same amount of time), a technique is needed which optimizes this synthetic scene rendering process. It would be an advantage if this technique were independent of the modeling process and primitive objects, and instead focused directly on the pixel rendering process.

Many computer graphics rendering systems in use today utilize a brute-force approach to convert modeled primitives into pixels. In other words, each primitive is taken, one at a time, and projected from three dimensional model coordinates (when the synthetic environment is three dimensional) into a two dimensional frame buffer memory. Part of this projection process includes calculating which pixels within the frame buffer are potentially touched by the primitive. Computing which pixels are touched is a process known as scanning. As each pixel is selected by this scanning process, the color of the pixel must be computed. Computing the color can be very complex if sophisticated lighting algorithms and textures are being used. Typical factors contributing to the pixel's color include the following: the modeled color, light sources shining on the primitive, texture, anti-aliasing, and visibility conditions.

In addition to computing the color of the pixel, a means must be provided for determining which primitive in the synthetic scene should be visible for any given pixel (or sub-pixel if anti-aliasing techniques are employed). This process is often referred to as hidden surface removal (i.e. removing all of the surfaces or primitives which are hidden by other surfaces which are closer to the observer). There are some common hidden surface removal techniques. These techniques include the painter's algorithm, list-priority algorithms, scan-line algorithms, and the z-Buffering (or depth buffering) algorithm. Each of these techniques has distinct advantages and disadvantages. Some of these techniques require the database to be rendered in a particular order, while others are order independent.

Unfortunately, rendering synthetic objects in a correct order on a computer display is not a trivial task. Determining which synthetic objects are in the foreground and which are in the background, and then displaying them in the proper order requires numerous calculations.

The painter's algorithm derives it's name from a common method of painting a picture. First, the background is painted, then objects which are less distant are painted, covering the more distant background, until finally the last objects painted are those which are closest in the foreground. Likewise, the painter's algorithm for hidden surface removal uses a similar approach. First, the distance of each object from the viewer is determined, then each object is drawn, beginning with the furthest and working toward the object which is closest in the foreground. While this method solves the problem of hidden surface removal, it raises several problems. First, sorting the primitives into the proper order in which the polygons must be drawn is not a trivial matter. Second, a lot of time is wasted drawing objects which may be largely obscured when the foreground objects are rendered. Third, objects which are inter-penetrating cannot be properly rendered.

An alternative state of the art method for rendering objects on a display is the z-Buffer algorithm. This algorithm determines which points on which polygon primitives are closest to the viewer for every pixel (or sub-pixel) on the computer display. It requires that the programmer set aside extra frame buffer memory to store the z (or depth) value for each pixel (or sub-pixel). Every time a point on the surface of the polygon is drawn into the frame buffer, the z coordinate of that point is placed into this array. If the z coordinate in the buffer is closer than that of the new point, the new pixel is not drawn because that point would be farther away than the old point and is therefore part of a hidden surface. If the z coordinate in the buffer is further than that of the new point, the new pixel is drawn over the old one and the z coordinate of the new point is put in the buffer, replacing the old one.

The z-Buffer algorithm has at least two drawbacks: time and memory. To implement the z-Buffer algorithm, it is necessary to keep track of a z coordinate for each pixel, and then do a comparison and a branch operation for every pixel. A looping procedure that uses so many branching operations is difficult to pipeline by a microprocessor, leaving it much slower than a simple and tight rendering loop.

Nevertheless, the z-Buffer algorithm, has a rather large advantage over just about all other known methods of hidden surface removal. As new polygon primitives are added to the synthetic scene, the amount of time consumed by the algorithm, increase linearly, not exponentially. Therefore, doubling the number of polygon primitives in the polygon list results in the time required to perform the z-Buffer algorithm also doubling (on the average). With other algorithms, the time may quadruple.

Other algorithms also typically require special modeling strategies and unique support structures in order to render the image properly. The z-Buffer approach eliminates most of these constraints, thereby simplifying the modeling process. Furthermore, complex situations such as inter-penetrating objects are correctly handled. Using the z-Buffer algorithm, the visible surface at each pixel is simply the primitive with the closest z value. As each primitive is rendered, this z parameter can be computed for each pixel touched. Along with storing the color of the pixel, the frame buffer is expanded to also store the z depth. As each new primitive is processed, the new z depth can be compared with the one already in the frame buffer. The frame buffer then simply keeps whichever primitive is closest to the observer. FIG. 1 shows a basic flowchart of a z-Buffered system.

One of the major disadvantages of the z buffer is that all of the color shading calculations are performed before the depth test is done, and the pixel may then be discarded by the frame buffer circuit. This required a lot of expensive (or time consuming) calculations to be performed with no final contribution to the image on the screen.

FIG. 1 shows that the relevant steps are as follows. In step 10, a database structure is evaluated. In step 12 geometric transformations are carried out. The next steps 14 and 16 are to accomplish pixel scanning and then pixel shading. Steps 18 and 20 are repeated in a loop to accomplish hidden surface removal while each pixel of the frame buffer is analyzed. When the scene is completely rendered to the frame buffer, it is then moved to an output side of the frame buffer memory where the completed synthetic image appears on the computer display in step 22.

Some of the other state of the art hidden surface removal techniques have enabled more cost effective architectures to be developed. For example, with the list-priority approach, the primitives are rendered in a front-to-back order. By recording which pixels (or array of pixels) are filled up by the primitives as they are rendered, later primitives can be tested against this record in order to not waste time processing the primitive against pixels which are already full. Consequently, fairly simple structures can be built to maintain and test against this full record, thus throwing out pixels before the expensive color shading calculations are performed. Thus, even though the depth complexity of the synthetic scene may be quite high, many of the pixels which would otherwise be thrown away after processing are simply skipped. This list-priory approach is shown in FIG. 2.

In FIG. 2, the first two steps 24 and 26 are the same as steps 10 and 12 of the z-Buffer algorithm. However, step 28 is the step of pixel scanning. Then a loop begins with steps 30, 32 and 34 where the technique carries out hidden surface removal, pixel shading and drawing to the frame buffer, respectively. As regions of the frame buffer are filled, data is fed back to the hidden surface removal section to prevent more distant primitives from being processed further. Finally, step 36 transfers the frame buffer to display memory.

One major disadvantage of the list-priority approach shown in FIG. 2 is that primitives must be modeled in such a way as to guarantee that they can be sorted into priority order. In some cases, this can be extremely difficult to do. This technique, like the painter's algorithm, does not support the notion of inter-penetrating primitives. Accordingly, the synthetic environments for which this technique can be used might be limited.

In general, the various hidden surface removal techniques provide either an efficient rendering architecture at the expense of complex modeling (e.g. the list-priority approach), or they simplify the modeling process at the expense of rendering efficiency (e.g. the z-Buffer algorithm).

Some recent systems have combined the "sort and record" schemes used previously by list-priority machines with the distinct modeling advantages of z-Buffered systems. This approach works well, but it is extremely expensive. First, large database sorting mechanisms are utilized to get the primitives in approximately a front-to-back order. The z-Buffer then performs the final sorting of primitives that may have been too close for the earlier sorting process. The simple full buffer used by the list-priority architectures is replaced with a more complex depth based record. As each array of pixels becomes full (i.e. fully covered by one or more fully opaque primitives), the furthest depth within the array is stored in the full record. Then, as new primitives are about to be rendered, their closest depth is compared with the record for all pixel regions that might need processing. If the new primitive's depth is further than that recorded in the full buffer, then that particular array of pixels need not be rendered.

The database sorting memories and controllers, the minimum and maximum depth calculations, and the depth based full buffer all add substantially to the cost of the system. The advantages gained by such an approach are particularly of value for applications requiring true real-time performance since the rendering load will be much more level than on a system without such capabilities. Without a means to skip filled regions, the rendering load will be directly proportional to the depth complexity of the synthetic scene. By employing these "full schemes," the rendering load is more directly tied to the display's resolution and not so much to the orientation of the database. Unfortunately, this approach to combining a z-Buffer and a full buffer are far too costly for mainstream computer graphics systems.

Consequently, it would be an advantage over the prior art to provide a technique which eliminates the need for large and costly memories and control structures. It would be a further advantage to be able to build the full buffer and associated control logic circuits directly inside custom integrated circuits. Accordingly, it would be an advantage to greatly reduce the cost and complexity of such circuits and thereby make it more affordable for low cost, more mainstream, computer graphics hardware. Therefore, it would be an advantage to provide real-time synthetic scene rendering in computer systems costing much less than in past computer systems.

OBJECTS AND SUMMARY OF THE INVENTION

It is an object of the present invention to provide a method and apparatus for rendering a synthetic environment with minimized impact due to high scene depth complexity.

It is another object to provide a method and apparatus for hidden surface removal in a synthetic environment which combines an efficient rendering architecture with a simplified modeling process.

It is another object to provide a method and apparatus for balancing the tasks of geometric primitive sorting and pixel rendering to thereby obtain real-time synthetic image rendering.

It is another object to provide a method and apparatus for decreasing the pixel rendering load by increasing the number of geometric sorting calculations when pixel rendering becomes excessively high.

It is another object to provide a method and apparatus for optimizing a processing load on a computer system by minimizing the sum of the processing time required for pixel rendering and geometric sorting.

It is another object to provide a method and apparatus for accomplishing an adaptive sorting technique which only sorts geometric primitives when pixel rendering time becomes longer than the time to accomplish geometric sorting.

It is another object to provide a method and apparatus for adaptive sorting which does not order an entire database in a strict front-to-back order, but to instead render first the primitives that are nearest to the observer.

It is another object to provide a method and apparatus for sorting only the largest primitives by monitoring how large each primitive is on the display screen.

It is another object to provide a method and apparatus for increasing the geometric sorting as the pixel rendering load increases.

It is another object to provide a method and apparatus for utilizing a full buffer, wherein each memory location contains a depth value for an array of pixels on the display.

It is another object to provide a reconfigurable memory structure for the full buffer, such that as the frame buffer size increases (more pixels arrays to store), the fewer number of bits of depth are stored per array in the full buffer.

It is another object to provide a method and apparatus for sacrificing depth precision when a larger display must be covered.

It is another object to provide a method and apparatus for preventing different applications from interfering with each other on a display by never marking a pixel array as full which is shared by the applications.

It is another object to provide a method and apparatus for initializing a full buffer utilizing the same scanning hardware which is utilized to render pixels.

It is another object to provide a method and apparatus for initializing the full buffer to any arbitrary values.

It is another object to provide a method and apparatus for improved pixel rendering by skipping the shading calculations for pixels which will not be rendered, and by skipping large blocks of pixels at once.

The present invention is realized in a method and apparatus for rendering a real-time synthetic environment on a computer display. A hidden surface removal technique is provided which combines an efficient pixel rendering architecture with a simplified modeling process. Specifically, the computer graphics hardware pixel processing load is balanced against a software geometric primitive sorting load to obtain optimum rendering performance by utilizing a "full" buffer in combination with adaptations of the z-Buffer and list-priority algorithms.

In one aspect of the invention, an adaptive sorting method is provided which maintains a processing load balance between pixel rendering and geometric sorting of the database which stores the primitives in the synthetic environment. Maintaining the balance enables parallel processing of the loads which results in a rapid display of the synthetic environment. Accordingly, this method only does as much optimization as is necessary, not as much as is possible.

In another aspect of the invention, a reconfigurable full buffer is provided which accommodates different screen resolutions by balancing the number of pixels which must be displayed against the bits of depth stored per pixel array.

In another aspect of the invention, a method is provided for enabling multiple applications to share the full buffer without interfering with each other.

In another aspect of the invention, a method is provided for fast full buffer initialization, where the memory can have any value stored therein using pixel scanning hardware.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Reference will now be made to the drawings in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow.

The object of the present invention is to render complex synthetic environments on a computer display either faster using a given amount of graphics hardware, or render more complex synthetic environments in the same amount of time that is currently required to render less complex synthetic scenes. As will be explained, the method above is accomplished by balancing the geometry calculations and the pixel rendering process of synthetic scenes with high depth complexity.

Figure 1:
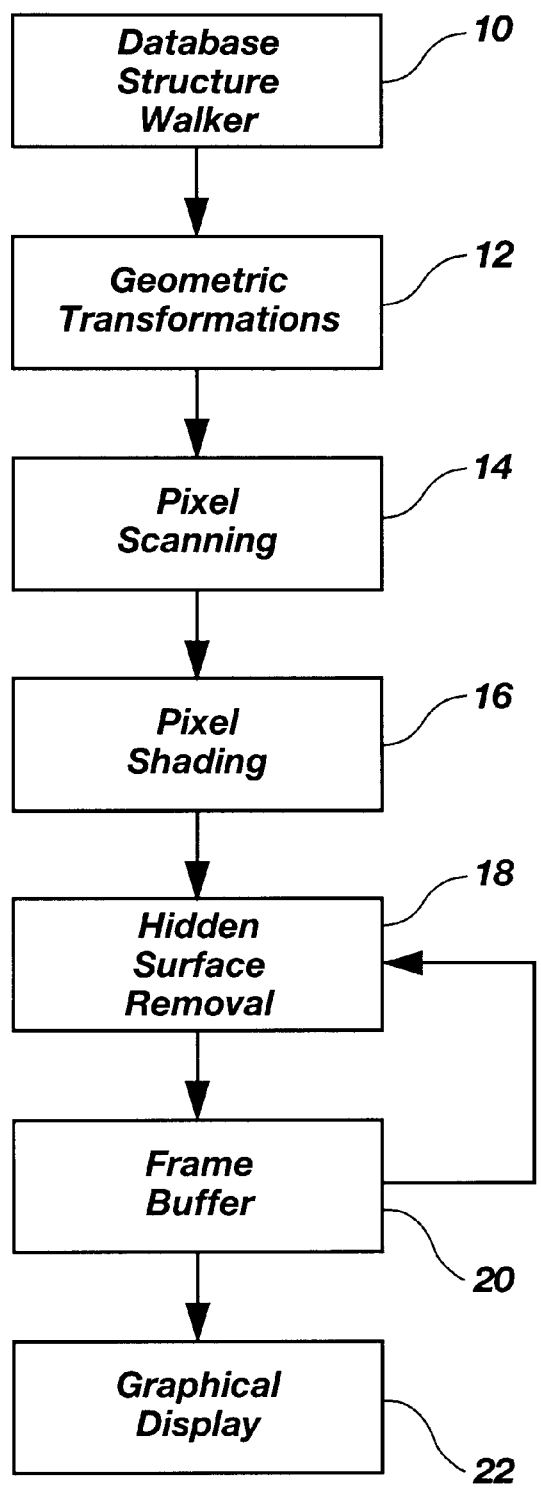
FIG. 1 is a flowchart of the steps of the prior art z-Buffer algorithm which are used in demonstrating the improvements of the present invention.
Figure 3:
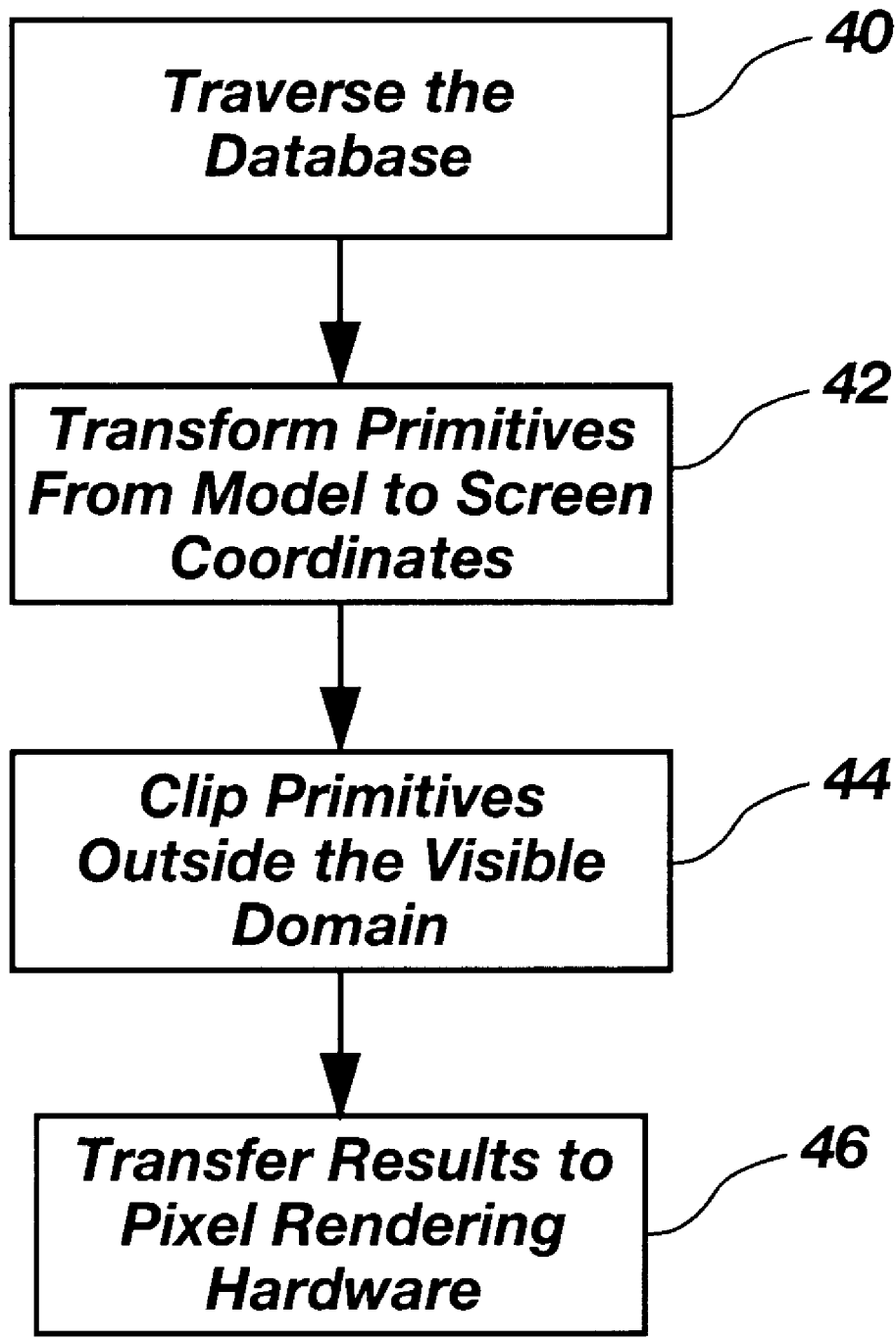
FIG. 3 is a flowchart which is provided to show greater detail of steps 10 and 12 from FIG. 1.

The process of generating a computer image consists of two primary tasks: geometric transformations and pixel rendering. FIG. 3 is provided to show greater detail of steps 10 and 12 from FIG. 1. FIG. 3 shows in a flowchart that the geometric operations consists of 1) traversing the modeled database structure in step 40, 2) transforming the database primitives from model coordinates into screen coordinates in step 42, 3) clipping primitives which lie partially or totally outside the visible domain in step 44, and 4) transferring the results to the pixel rendering hardware (or software) in step 46. The pixel operations, as discussed above, include scanning, lighting or shading, texturing, visibility, hidden surface removal, etc.

The time required to perform the geometric operations is primarily a function of the number of primitives being rendered, while the time to render the pixels is a function of the number of pixels needing to be rendered which is a function of the size of the primitives as viewed on screen. When utilizing graphics acceleration hardware, these t-two processes can be performed in parallel. Consequently, the overall time required to render a synthetic scene will be limited by the worst case of these geometric and pixel rendering operations. Without the use of dedicated graphics hardware, the rendering time would be the sum of the time required to accomplish both tasks. It is important to note that the balance between a geometric processing load and pixel rendering load will vary depending upon the database structure and the viewer's position within that database. Therefore, a significant point of novelty of the present invention was the realization that if the processes are performed in parallel, and a balance is reached between the geometric processing load with respect to a pixel rendering load, the rendering process is significantly improved.

It is therefore made apparent that the present invention achieves its objective by providing a means for balancing the geometric processing and the pixel processing load via the full buffer. The full buffer represents the maximum depth value of an array of pixels stored in the frame buffer. Thus, one item in the full buffer represents many items in the frame buffer; the full buffer is much smaller. Therefore, an "array" of pixels maps to one full buffer location. It is also noted that level-of-detail management, perspective size culling, etc. are all techniques which can be utilized to help provide load balancing. However, none of these techniques provide direct control of the full buffer's effectiveness.

While it is true that with a full buffer, a synthetic scene will be rendered correctly regardless of the rendering order, that does not mean that the process is optimized. It is the case that the best efficiency is obtained when the order of the primitives presented to the full buffer is front-to-back.

Another important implementation aspect of the present invention is that with the new technique, the amount of geometric sorting will vary depending upon the pixel rendering load. If the pixel rendering time becomes excessively high, the geometric sorting calculations will increase, thus presenting more of the database in a front-to-back order. While this might seem counterproductive because the overall processing load is being increased even further, the end result is that the pixel rendering load will decrease. Accordingly, by devoting resources to carrying out special geometric sorting calculations, the pixel rendering process can be optimized until the geometric sorting and the pixel rendering processes reach an equilibrium. In equilibrium, the sum is also said to be minimized. This is because when the processes are out of balance, it is not a linear change. In other words, there is not an equal give and take of time between the processes when there is an imbalance. The process which is increasing in time actually increases an amount which is greater than the amount of time by which the other process might decrease.

Figure 2:
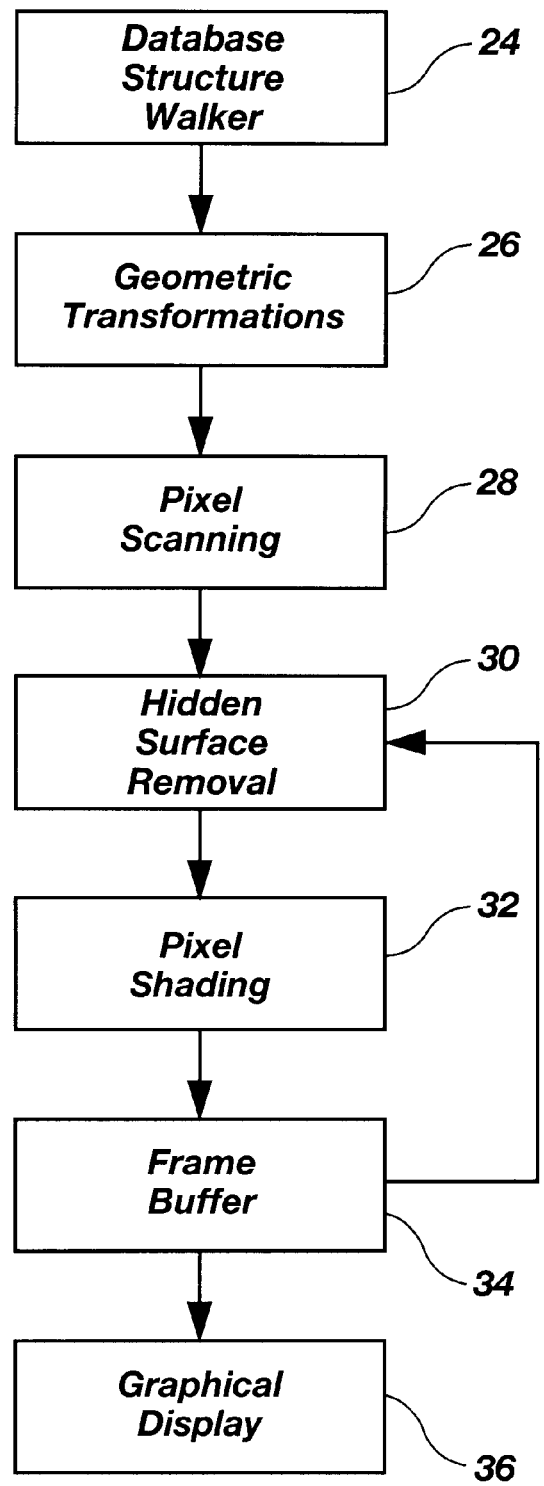
FIG. 2 is a flowchart of the steps of the prior art list-priority algorithm which are used in demonstrating the improvements of the present invention.
Figure 4:
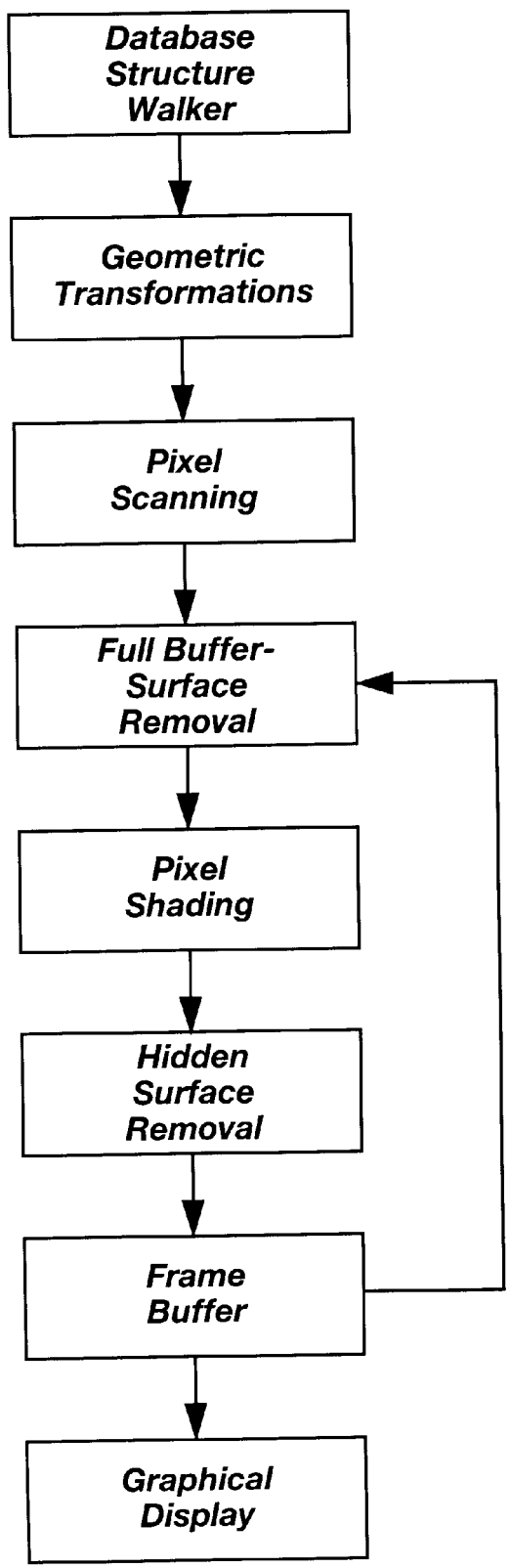
FIG. 4 is a flowchart of the steps of the presently preferred embodiment which is constructed in accordance with the principles of the present invention.

FIG. 4 is presented to show in a flowchart the presently preferred embodiment of the present invention. The technique as outlined therein will be explained hereinafter as a series of processes (steps). However, by way of introduction, it is useful to understand from the outset that in a cost-effective manner, the present invention provides the advantages of at least two distinct hidden surface removal strategies, that of the z-Buffer (FIG. 1) and the list-priority (FIG. 2) algorithms. There are four principle processes which are involved. They are geometric database sorting, initializing the full buffer, bypassing regions which are already full, and updating the record as regions are filled by primitives. Furthermore, there are several implementation techniques which have been developed to optimize the present invention's effectiveness at pixel rendering.

While reading the explanations to follow, it is useful to remember that the presently preferred embodiment fundamentally deviates from the state of the art through the use of: 1) adaptive geometric sorting which is used as required to maintain process load balance, 2) a reconfigurable full buffer memory structure to accommodate different display resolutions, 3) a method for allowing multiple applications to share the full buffer without interfering with each other, 4) fast full buffer initialization to any value using pixel scanning hardware, 5) a method for computing depth at one region corner, and 6) sequential accumulation of full status.

Current state of the art techniques rely on more straight-forward, brute force approaches that cost significantly more to implement. The present invention relies on insights about the underlying processes. Rather than trying to solve all problems all of the time, it advantageously solves only the most important problems, and only when they arise.

The means for obtaining a balanced processing load can be broken up into several processes, beginning with the geometric sorting process of the database. Because the pixel rendering architecture is based on a z-Buffer, it is not necessary to sort the database in order to render the correct image. However, with the use of a full buffer, the geometric sorting will allow the synthetic image to be rendered faster. This synthetic image can be rendered faster because the full buffer will reject regions of the synthetic scene that do not require processing for any given primitive. Consequently, the pixel rendering performance can be very high if the primitives are processed in a front-to-back order. However, if the primitives are listed in a reverse order, there will be no performance gain at all.

The above explanation would make it appear that one of the improvements provided by the present invention is to make it a combination of z-Buffer and list-priority technique. However, the present invention advantageously improves upon the combination in that rather than being constrained by list-priority data structures or large and expensive sorting mechanisms, this new approach utilizes a sort-as-much-as-is-needed, or adaptive-sorting, technique.

Accordingly, if the pixel rendering time is acceptable (i.e. is shorter than the time to do the geometric sorting calculations or shorter than a desired frame time), no sorting is required. On average, without any sorting, about one half of the database will already have a front-to-back order, with the other half in the reverse order. The accelerated graphics hardware will optimize the pixel rendering process as much as possible at all times. However, if the pixel rendering time starts to exceed the time required for geometric sorting (or frame time), the geometric sorting software can then turn to devoting time to sorting the database to thereby reduce the pixel rendering time.

It has been proven through experimentation that a small amount of geometric sorting can have a tremendous impact on the pixel rendering performance. In general, it is not necessary to render the entire database in a front-to-back order as in the prior art. Instead, it is better to first render only the first primitives that are at the front. In general, due to perspective, the up-front primitives will be quite large on the screen. Therefore, they will mark large portions of the screen as being full. Once a pixel array is marked full, it does not matter in what order the more distant primitives are processed because they will all be quickly rejected as being behind the nearer primitives.

It has also been discovered that by monitoring how large each primitive is on the display, it is possible to sort only the really large primitives. These are the primitives which when geometrically ordered will result in a large improvement in pixel rendering performance. For static imagery, or for slowly changing synthetic images, it is quite acceptable to use data from the previous synthetic image to determine which primitives to render first for the next synthetic image.

One of the advantages of this adaptive-sorting is that the computer system is free to completely balance geometric sort and pixel rendering loads. The higher the pixel rendering load, the more time can be spent on sorting the geometry. Accordingly, the computer system always runs at an optimum level.

A next improvement over the prior art is simplification in the full memory buffer itself. Each memory location in a "full" buffer contains a depth value for an array of pixels on the display. The exact size of the pixel array is not relevant to the invention, but it does impact the computer system's overall performance. While small arrays are easily filled (or covered) by primitives, they require larger memories to cover the entire display, and they provide less of an advantage when a primitive determines that it can skip those pixels. The larger the array, the larger the primitive must be to cover it, but more pixels can be skipped after each test, and better potential speed improvements are possible. As a practical matter, determining an optimum balance between how fast the arrays fill and how many pixels are skipped is dependent upon the database structure being displayed. Generally, making some compromise between how fast the arrays fill and the number of pixels which are skipped is appropriate.

Storage to record the maximum depth value would require a full 32 bits (for floating point data) within each pixel array. For large screen sizes, and/or small array sizes, this can lead to a vast quantity of memory. However, the present invention was intended to fit inside an integrated circuit. Therefore, the memory had to be much smaller than the approach above would otherwise indicate. Furthermore, the memory had to be capable of operating with a vast number of frame buffer sizes. This is only logical because each application would be optimized differently depending upon the complexity of the synthetic environment to be displayed.

The present invention's solution to the problem of memory size is to advantageously provide a reconfigurable memory structure. As the frame buffer size increases (i.e. there are more pixel arrays to store), the fewer number of bits of depth are stored per array. Thus, based on the system's frame buffer configuration, the full buffer is configured to cover as much of the frame buffer as desired with as many bits of depth as will fit. In other words, to cover larger displays, precision in the depth is sacrificed. Advantageously, by using appropriate depth metrics, this reduction in precision never causes a visual error, but may reduce the effectiveness of the circuit in skipping unneeded pixel rendering. Losing precision means that primitives which may reside very close together may not benefit from the full buffer. However, actual results have shown that, in general, the loss of performance is negligible.

In addition to providing configurable size and depth, the memory can be configured to cover any rectangular portion of the frame buffer as desired. Thus, if there are regions of the frame buffer that are not being utilized for high-speed pixel rendering, the memory can be allocated more effectively where it will contribute the most to improving performance.

Another advantage of the full buffer as described is that it inherently has the ability to prevent different applications from interfering with each other if they both touch pixels in the same pixel array. For example, on a standard PC or Workstation, it is quite common to have multiple windows open with a different application running in each window. If two (or more) windows share a pixel full region, neither application should mark the array as full because this would falsely interfere with the other applications.

The discussion above related generally to the advantages of the full buffer. However, before the full buffer can be used, it must be properly initialized. The full buffer initialization process both clears out old data and sets up new data to insure that the synthetic image will render properly. Without proper initialization, the full buffer may reject portions of primitives which should not be skipped, and an erroneous image will result.

In general, the full buffer is initialized to the furthest possible depth value. However, it is sometimes of value to initialize portions of the buffer to other depth values. For example, if an overlay image (i.e. pull down menus) covers portions of the synthetic image window, these areas can be initialized with the closest possible depth value so that no time is wasted rendering data which is hidden from view by the overlay image.

The present invention also makes possible the rapid initialization of the full buffer, regardless of its size and depth configuration. The full buffer can be initialized to any desired value, including a disable marker for regions which contain multiple windows.

To provide high-speed initialization, and to minimize the required support circuitry, the pixel scanning circuit can be set into a mode which scans pixel arrays rather than pixels. Advantageously, the same scanning hardware can be utilized to both render the pixels and to initialize the full buffer.

In contrast, systems in the prior art have utilized a single valid flag per pixel array to indicate whether the data in the buffer is current. This single bit memory could quickly be cleared prior to rendering the synthetic image in order to initialize the system. While this initialization scheme is fast, disadvantageously it requires special memory, and it cannot be initialized to any arbitrary value. The present invention allows each memory location in the full buffer to be initialized to any desired value, and it reuses existing circuitry to do this.

Once the full buffer has been initialized, the pixel rendering process can begin. The first step in rendering is to determine which pixels need processing for a given primitive. As these pixels are identified, they are tested against the full buffer to see if they can be skipped. The speed improvement comes from 1) skipping the shading and z buffer calculations for pixels which can be skipped, and 2) by skipping large blocks of pixels at once.

In order to carry out the full test described above, the closest depth to the primitive being rendered must be known. This is calculated in two steps. The first step is to find the closest vertex. The second step is to find the closest depth value within the array.

The first step, because the depth value is related to the z coordinate, makes it possible to find the closest point on the primitive by comparing the z values at each of the primitive vertices. It is not important to identify which vertex is closest, but just to find its depth value.

The second step may refine this depth value to provide improved performance if the primitive is large, and covers many pixel arrays, it is extremely helpful to find the closest depth value within each array. Since all primitives are generally planar, it is possible to find the closest depth at only one of the array corners. If the closest array corner is further than the closest vertex, the corner's depth value can be used for the full buffer test. If the vertex depth value is further, then the vertex depth must be used.

Rather than calculate the depth value at each of the array corners and compare them to determine which is nearest (as is done in the prior art), the primitive's depth slope data can be used to point to the corner that will be the closest. Therefore, some simple sign bit comparisons can be utilized to determine at which corner the depth should be calculated.

Once the closest depth value of the primitive is determined, it can be compared with the depth value already stored in the full buffer for each array requiring pixel processing for the primitive. If the depth value is further than the recorded depth, the array can be skipped. If not, the array must be processed to find the pixel's shading values, and then execute the entire z-buffer test.

As primitives which pass the full buffer test are rendered into the frame buffer, they are monitored to see if they completely fill any of the pixel regions being processed. If they do, their maximum depth value within the array may be loaded back into the full buffer. If the primitive completely fills the array, and its maximum depth is closer than the value already in the full buffer, the new primitive depth will overwrite the old value. Thus, the full buffer gets refined with the closer and closer primitives as needed in order to reject more of the database. This is why making primitives to be ordered in a front-to-back order can greatly impact performance. If the closest primitives are rendered first, they will record close-in depth values and thereby cause many of the more distant primitives to be quickly rejected. It should be apparent that partially transparent primitives must rot mark the array full since more distant primitives may still be visible in the pixels.

State of the art graphics systems which have utilized a full buffer have performed a full buffer update process by examining every pixel (and should be considered to include sub-pixels) within a selected portion of the frame buffer. A comparison is made of the depth value for every pixel to determine the maximum depth within the array. This approach is very costly (in time or hardware) since many pixels must be accessed and compared in order to determine whether the array is completely covered and at what maximum depth. Once the region is completely covered, it can be marked full, regardless of how many primitives it took to cover it.

In order to reduce size and cost of the full buffer, the present invention only marks a pixel array full if a single primitive completely covers the array, rather than a composite of multiple primitives. Furthermore, rather than compare depth values (often with 32 bit floating point data) at each pixel, a covered flag bit is accumulated as each pixel within the array is scanned. If the primitive completely covers every pixel in the array, the flag will indicate this, and the full buffer can be updated with a new depth value. This sequential comparison of a single "covered" flag is substantially smaller and cheaper than the older approach of doing parallel comparisons of depth values.

Furthermore, rather than compare all of the z-Buffer depth values, we simply compute the depth at the appropriate corner of the array. As in the situation of determining the minimum depth, the primitive's slope value can be used to identify which corner will yield the maximum depth value.

Returning again to FIG. 4, it is seen that by checking for full regions early in the method, the expensive pixel shading operations do not have to be performed for areas that would simply be discarded by the z-Buffer. Primitives which require rendering are constantly monitored and fed back in the loop to thereby keep the full buffer up to date and thereby maximize the circuits effectiveness.

Another aspect of the present invention is directed to the method and apparatus used to record information in the full buffer. It has been determined that it is advantageous to serially store values in pixel arrays within the full buffer rather than in parallel. In other words, the full status of every pixel within a pixel array is processed and serially accumulated. If all pixels in the pixel array are full, the pixel array is marked as full.

Another aspect of the present invention is related to the finding the closest or nearest point within a pixel array stored in the full buffer. Finding the closest or nearest point is useful to test when certain pixel arrays do not require processing and are thus bypassed. It is also useful to determine the furthest point within a pixel array to store back in the full buffer. The furthest point is the opposite corner of the primitive relative to the closest point. The furthest point is stored in the full buffer when non-bypassed primitives fill an array region.

It is to be understood that the above-described arrangements are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. A method for increasing a rate of rendering a synthetic image on a computer display, wherein the synthetic image is generated from a database of modeled primitives, said method comprising the steps of:

(1) performing a plurality of geometric sorting calculations on the database of modeled primitives in the frame buffer to thereby prepare the synthetic image for rendering;

(2) bypassing rendering operations for frame buffer regions which are completely covered;

(3) recording frame buffer regions in a fall buffer which are correctly covered;

(4) monitoring a length of time required to render the synthetic image to determine if a rendering load is excessive; and (5) increasing a number of eometric sortings being calculated if the rendering load is excessive to thereby decrease the rendering load.

2. The method for increasing the rendering rate as defined in claim 1 wherein the method further comprises the step of increasing the total number of geometric sorting calculations if the pixel rendering load:

(1) exceeds a geometric sorting load which is a total time required to perform the geometric sorting calculations; or (2) exceeds a specified frame rate.

3. The method for increasing the rendering rate as defined in claim 2 wherein the method further comprises the step of balancing the rendering load and the geometric sorting load.

4. The method for increasing the rendering rate as defined in claim 2 wherein the method further comprises the step of minimizing a sum of the rendering load and the geometric sorting load.

5. The method for increasing the rendering rate as defined in claim 1 wherein the method further comprises the step of performing geometric sorting calculations only when the rendering load exceeds a geometric sorting load or frame time which is a total time required to perform the geometric sorting calculations.

6. The method for increasing the rendering rate as defined in claim 1 wherein the method further comprises the steps of:

(1) determining a relative size or closeness of the modeled primitives in the database;

(2) sorting the modeled primitives and selecting those primitives which meet a specified criteria defined as being equal to or greater than a selected size or closeness; and (3) performing geometric sorting calculations on only the primitives selected in step (2).

7. The method for increasing a rendering rate as defined in claim 1 wherein the method further comprises the steps of:

(1) performing the plurality of geometric transformations in software; and (2) simultaneously performing the rendering of the synthetic image in hardware.

8. The method for increasing the rendering rate as defined in claim 1 wherein the method further comprises the steps of:

(1) providing a reconfigurable memory structure or full buffer which contains a depth value associated with each pixel array in the frame buffer; and (2) balancing the precision of the depth value against a total number of the pixel arrays.

9. The method for increasing the rendering rate as defined in claim 8 wherein the method further comprises the steps of decreasing a total number of bits allocated to the depth value when more pixel arrays are needed when the computer display resolution increases, and increasing a total number of bits allocated to the depth value when less pixel arrays are needed when the computer display resolution decreases, or when only a subset of the computer display needs to be covered by the full buffer.

10. The method for increasing the rendering rate as defined in claim 1 wherein the method further comprises the steps of:

(1) providing a reconfigurable memory structure or full buffer which contains a depth value associated with each pixel array in the frame buffer; and (2) initializing the full buffer using the scanning hardware also used for rendering pixels.

11. The method for increasing the rendering rate as defined in claim 10 wherein the method further comprises the step of initializing the depth values of the full buffer to any arbitrary values.

12. The method for increasing the rendering rate as defined in claim 1 wherein the method further comprises the step of bypassing shading calculations for pixels which will not be rendered.

13. A system for increasing a rate of rendering a synthetic image on a computer display, wherein the synthetic image is generated from a database of modeled primitives, said system comprising:
- a reconfigurable full buffer memory which allocates memory space between pixel arrays and associated depth bits;
- means for reallocating the memory space between the pixel arrays and the depth bits to thereby obtain either greater screen resolution or greater precision in a depth comparison;
- means for sorting the modeled primitives such that the modeled primitives can be ordered relative to distance from an observation point; and
- means for rendering pixels on the computer display such that the modeled primitives which are not obscured by other modeled primitives are visible within the synthetic image.

14. The system as defined in claim 13 wherein the means for reallocating the memory space between the pixel arrays and the depth bits further comprises a means for reallocating the full buffer memory such that any rectangular portion of the frame buffer memory can be represented.

15. The system as defined in claim 13 wherein the means for reallocating the memory space between the pixel arrays and the depth bits further comprises a means for preventing different software applications from interfering with each other if the software applications both want to utilize pixels stored in a same pixel array.

16. The system as defined in claim 13 wherein the system further comprises a means for initializing the reconfigurable full buffer memory with any arbitrarily selected value.

17. The system as defined in claim 16 wherein the means for initializing the reconfigurable frame buffer memory further comprises pixel scanning hardware which is also utilized to render pixels on the display, thereby efficiently utilizing a computer resource.

18. The system as defined in claim 17 wherein the pixel scanning hardware is modified so as to be able to selectively input values into the full buffer or pixels into the frame buffer.

19. A method for increasing the rate of rendering three-dimensional synthetic images on a computer graphics display, wherein the synthetic images are generated by at least two applications which both want to utilize pixels stored in a same pixel array of a frame buffer, said method comprising the steps of:
(1) rendering the synthetic images in a full buffer by utilizing pixels stored in at least one pixel array; and
(2) defining a status of the at least one pixel array in the full buffer which is shared by the applications as not being full, to thereby prevent interference by either application with the other.

20. A method for increasing a rate of rendering a synthetic image on a computer display, wherein the synthetic image is generated from a database of modeled primitives, said method comprising the steps of:
(1) determining which pixels require processing for each of the plurality of primitives;
(2) determining a closest pixel depth to each of the plurality of primitives being rendered, further comprising the steps of:
(i) determining a closest vertex of each of the primitives being rendered relative to the observer; and
(ii) determining a closest depth value for the primitive within a given pixel array; and
(3) comparing the closest depth value of the primitives requiring processing against depth values in a fall buffer to thereby determine if the pixels in the given pixel array do not require further processing, wherein shading calculations are consequently terminated.

21. The method as defined in claim 20 wherein the step of determining a closest vertex of each of the primitives being rendered relative to the observer further comprises the step of comparing depth values at each vertex of the primitive to thereby locate a closest depth value.

22. The method as defined in claim 20 wherein the step of determining a closest value for the primitive within a given pixel array further comprises the steps of:
(1) determining if a closest point within the pixel array has a further depth value than a closest vertex; and
(2) utilizing the depth value of the closest array corner for the full buffer test if the closest array corner is further than the closest vertex, otherwise, utilizing the depth value of the closest vertex.

23. The method as defined in claim 22 wherein the step of determining whether the closest value for the primitive within a given pixel array has a further depth value than a closest vertex further comprises the step of utilizing a depth slope comparison.

24. The method as defined in claim 23 wherein the method further comprises the step of making, a sign bit comparison to determine at which corner the depth value is to be calculated.

25. The method as defined in claim 24 wherein the method further comprises the steps of;
(1) comparing the closest depth value with a depth value already stored in the full buffer for each pixel array requiring processing for the primitive; and
(2) bypassing the array when the depth value is further than the recorded depth in the full buffer, otherwise, processing the pixel array to determine a shading value for each pixel and executing z-Buffer testing.

26. The method as defined in claim 25 wherein the method further comprises the steps of:
(1) monitoring a rendering process to determine if the primitives which are being recorded in the frame buffer completely fill any pixel arrays of the full buffer being processed;
(2) loading a maximum depth value of a primitive into the full buffer if the pixel array is completely filled; and
(3) overwriting an old full buffer depth value if the primitive completely fills the array, and the maximum depth value is closer than the depth value already in the buffer.

27. A method for recording values in a full buffer when accumulating a full status of a plurality of pixels processed in a pixel array, said method comprising:
(1) determining which pixels of the plurality of pixels require processing for each of the plurality of primitives;
(2) serially accumulating a full status of a plurality of pixels stored in at least one pixel array as the plurality of pixels are processed; and
(3) marking the pixel array as full if the plurality of pixels in the pixel array are determined to be full.

28. The method as defined in claim 27 wherein the method further comprises the step of comparing the depth value of the primitives requiring processing against depth values in a full buffer to thereby determine if the pixels in a region do not require further processing, wherein shading calculations are consequently terminated.

29. The method as defined in claim 28 wherein the method further comprises the step of determining a furthest pixel depth relative to each of the plurality of primitives being rendered.

30. The method as defined in claim 29 wherein the method further comprises the steps of:
   (1) determining a furthest vertex of each of the primitives being rendered relative to the observer; and
   (2) determining a furthest value for the primitive within a given pixel array.

31. The method as defined in claim 30 wherein the step of determining a furthest vertex of each of the primitives being rendered relative to the observer further comprises the step of comparing depth values at each vertex of the primitive to thereby locate a furthest depth value.

32. The method as defined in claim 30 wherein the step of determining a furthest value for the primitive within a given pixel array further comprises the steps of:
   (1) determining if a furthest point within the pixel array has a further depth value than a furthest vertex; and
   (2) utilizing the depth value of the furthest array corner for the full buffer test if the furthest array corner is further than the further vertex, otherwise, utilizing the depth value of the further vertex.

33. The method as defined in claim 32 wherein the step of determining whether the furthest value for the primitive within a given pixel array has a further depth value than a furthest vertex further comprises the step of utilizing a depth slope comparison.

34. The method as defined in claim 33 wherein the method further comprises the step of making sign bit comparison to determine at which corner the depth value is to be calculated.

35. The method as defined in claim 34 wherein the method further comprises the step of determining the furthest vertex to store in the full buffer when non-bypassed primitives fill an array region.

36. The method as in claim 19 further comprising the step of initializing portions of the full buffer to closest possible depth values so rendering is avoided when those portions of depth buffer are covered by two dimensional graphics.

* * * * *